United States Patent [19]

Papuchon

[11] Patent Number: 4,583,817
[45] Date of Patent: Apr. 22, 1986

[54] NON-LINEAR INTEGRATED OPTICAL COUPLER AND PARAMETRIC OSCILLATOR INCORPORATING SUCH A COUPLER

[75] Inventor: Michel Papuchon, Issy les Moulineaux, France

[73] Assignee: Thomson-CSF, Paris, France

[21] Appl. No.: 536,441

[22] Filed: Sep. 27, 1983

[30] Foreign Application Priority Data

Sep. 28, 1982 [FR] France .................. 82 16297

[51] Int. Cl.⁴ .............................................. G02B 6/10
[52] U.S. Cl. .............................. 350/96.14; 350/96.11; 350/96.12; 350/96.13; 350/96.34
[58] Field of Search ............... 350/96.10, 96.11, 96.12, 350/96.13, 96.14, 96.30, 96.34

[56] References Cited

U.S. PATENT DOCUMENTS

| | | | |
|---|---|---|---|
| 3,622,911 | 11/1971 | Marcatilli | 350/96.14 |
| 3,801,185 | 4/1974 | Ramaswamy et al. | 350/96.14 |
| 3,822,927 | 7/1974 | Zernike | 350/96.12 |
| 4,198,116 | 4/1980 | Papuchon | 350/96.14 |
| 4,236,785 | 12/1980 | Papuchon et al. | 350/96.14 |
| 4,340,272 | 7/1982 | Papuchon et al. | 350/96.14 |

FOREIGN PATENT DOCUMENTS

| | | | |
|---|---|---|---|
| 0031263 | 11/1980 | European Pat. Off. | 350/96.14 |
| 2309890 | 4/1975 | France | 350/96.14 |

OTHER PUBLICATIONS

Jackel et al., "Variation in Waveguides . . . Hydrogen", Appl. Phys. Lett., vol. 41, No. 6, 9/15/82, pp. 508–509.

Primary Examiner—William L. Sikes
Assistant Examiner—Brian M. Healy
Attorney, Agent, or Firm—Oblon, Fisher, Spivak, McClelland & Maier

[57] ABSTRACT

The invention relates to a coupler in which the coupling between the waveguides is carried out on the one hand, by means of evanescent waves propagating in the medium separating these guides, and on the other hand by means of a non-linear interaction in the substrate, where the waveguides are produced. A first guide is produced by ion exchange of H+ ions and a second guide by local titanium diffusion in the substrate.

12 Claims, 6 Drawing Figures

FIG. 1 *PRIOR ART*
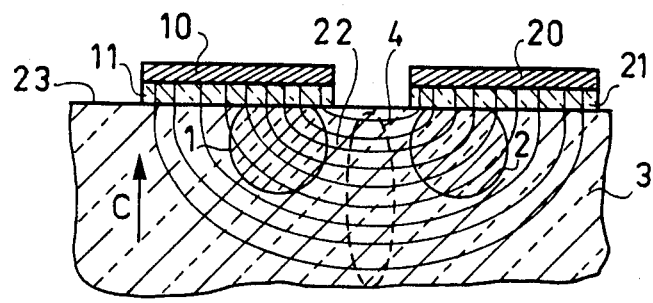
FIG. 2 *PRIOR ART*
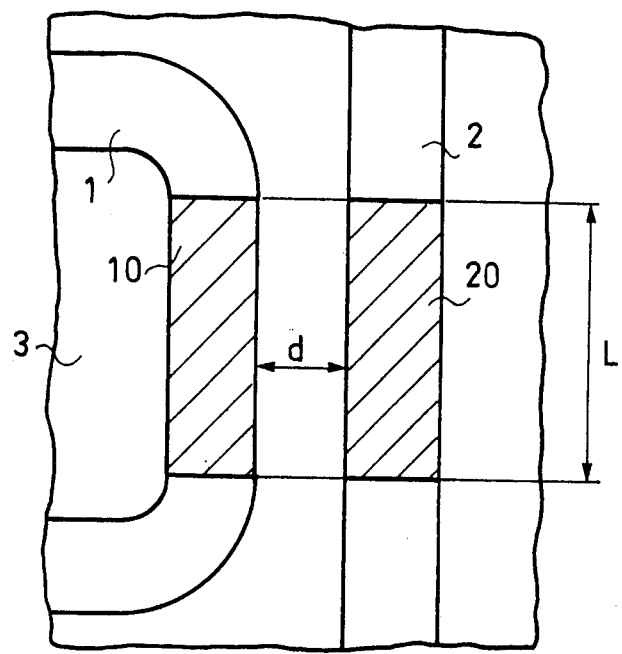

NON-LINEAR INTEGRATED OPTICAL COUPLER AND PARAMETRIC OSCILLATOR INCORPORATING SUCH A COUPLER

BACKGROUND OF THE INVENTION

The present invention relates to a non-linear optical coupler and to a parametric oscillator incorporating such a coupler. As a result of electrical controls, such a coupler is able to transfer between two waveguides having a common coupling zone, all or part of the light energy carried by one of them. It also makes it possible to modulate the light energy carried by one of the waveguides.

The term integrated optics is used to define thin layer monolithic structures used for processing light signals obtained by deposition, diffusion and etching by masking, as used in the production of integrated electronic circuits As a result of these processes, it is possible to produce linear structures characterized by a higher refractive index than that of the surrounding medium, whilst forming waveguides along which the light is propagated by a sequence of total reflections or progressive refractions.

It is known to link two such waveguides, by arranging them parallel to one another over part of their path in order to obtain directional couplers. As a result of the evanescent wave phenomenon, the energy carried in the first guide passes progressively into the second guide and a maximum of the transferred energy is observed at the end of a certain length, called the coupling length, which is dependent on the geometrical and optical parameters of the structure and in particular the value of the refractive indices of the materials constituting the two guides and the medium separating them, then the energy progressively passes back from the second guide into the first guide and so on. It is also known that by using an electro-optical material as one of the materials constituting the guides or the medium separating them to vary the index under the action of an electrical field which, by acting on the coupling length, makes it possible to electrically control the energy portion transferred from one guide to the other. On the basis of this principle, it is also possible to obtain a light modulator by arranging, parallel to the guide carrying the light wave, a guide section into which is transferred a varyingly large portion of said energy.

In addition, there are frequency converters for producing, from guided electromagnetic radiation of frequency $\omega$, guided electromagnetic radiation, whose frequency is a multiple of the frequency $\omega$. These converters are more particularly used in the field of integrated optics, a term used by analogy with integrated electronic circuits, which are monolithic structures using thin layers.

It is known that the propagation of an electromagnetic wave of frequency $\omega$ in an anisotropic material, such as birefringent crystals of potassium deuterophosphate (KDP), gives rise to harmonic waves of frequency $p.\omega$ (p integer, $p \geq 2$). However, most of the emergent energy remains at the fundamentally frequency $\omega$, which indicates that the conversion efficiency is generally mediocre. Such a non-linear phenomenon also occurs during the refraction, as well as the reflection accompanying it, of a light beam on an interface separating two media having different refractive indices. However, the intensity of the conversion phenomenon is well below that of the preceding case.

In the field of integrated optics, a problem arises with respect to the use of this non-linear phenomenon with a view to obtaining an adequate conversion efficiency, because the deposition of anisotropic material in thin layers cannot be carried out by conventional methods used for producing electronic integrated circuits.

SUMMARY OF THE INVENTION

Compared with linear couplers, the coupler according to the invention permits the generation of a wave at a frequency defering from that of the incident wave. The coupling between two guides takes place for different wavelengths, which have identical propagation constants in said guide.

In addition, the inventive coupler has the advantage of permitting the spatial separation of the incident wave and the waves generated by a non-linear effect, said waves propagating in different guides.

The invention makes it possible to use the very large linear coefficients of certain materials, such as the order 3, non-linear susceptibility co-efficients $\chi_{333}$ in lithium niobate ($LiNbO_3$) or in lithium tantalate ($LiTaO_3$), which permits a much greater interaction efficiency between the guides, as well as a very large optical energy density for a relatively low light power level.

Finally, the interaction can be regulated with the aid of an electrical field applied to the waveguides, which makes it possible to regulate the phase matching between the waves transmitted by these various guides. The invention can also be used in the case of simple non-linear interactions, such as the second harmonic generation, and in more complex interactions, such as those used in a parametric oscillator.

The invention therefore relates to a non-linear integrated optical coupler comprising a plane substrate, having an input face and an output face, made from a non-linear electro-optical material, and at least two waveguides, whereof one receives an incident guide, disposed on the surface of said substrate, these waveguides being parallel to one another over a predetermined length and separated by a distance such that the incident wave radiation can be transferred from one guide to the other, wherein a first guide is obtained by ion exchange of $H^+$ ions in the substrates and a second guide by localized titanium diffusion into the substrate.

The invention also relates to a parametric oscillator incorporating such a coupler.

BRIEF DESCRIPTION OF THE DRAWINGS

The invention is described in greater detail hereinafter relative to non-limitative embodiments and the attached drawings, wherein show:

FIGS. 1 and 2 a sectional view and a plan view of a prior art coupler.

DETAILED DESCRIPTION OF THE INVENTION

Figure 3:
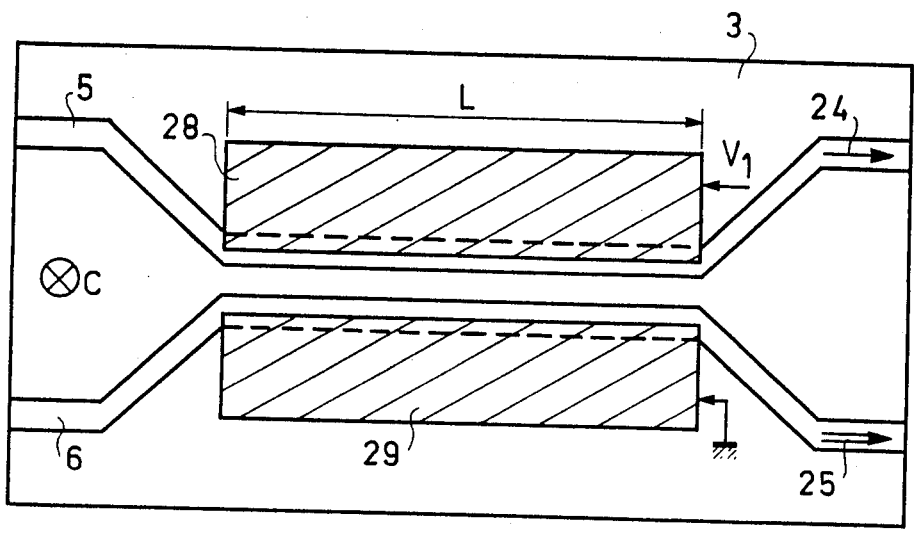
FIG. 3 the coupler according to the invention.

FIGS. 1 and 2 are respectively a sectional view and a plan view of a switch produced in linear optics. The two light waveguides 1 and 2 are inserted in the substrate. Couplings takes place by means of the material constituting the substrate. In order to implant guides 1 and 2, for example, it is possible to diffuse titanium into a substrate constituted by a lithium niobate monocrystalline wafer. In the diffusion zone, the titanium partly takes the place of the niobium in order to give a mixed compound of formula $Li\ Ti_x Nb_{1-x}O_3$, having a refractive index higher than that of the pure niobate. These diffused areas, having a higher index than that of the substrate, constitute the waveguides 1 and 2. If the diffusion temperature is higher than the Curie point of the material, use is made of the consecutive cooling phase for subjecting the wafer to a uniform electrical field, so as to uniformly polarize it and thus produce a "mono-domain" or single domain structure.

When a voltage is applied between electrodes 10 and 20, a field line distribution illustrated by reference numeral 4 in FIG. 1 is produced. The component of the field in direction C, perpendicular to the substrate surface 23, is of the same absolute value and opposite direction in both guides, leading to refractive index variations of the same absolute value, but opposite signs. Nevertheless, the existence in a direction perpendicular to the direction of the axis C of the substrate, which carries its extraordinary index, of a component of the non-zero field, as well as the fact that the electrical field applied also varies the index value in that part of substrate 22 between the two guides leads to a certain asymmetry of the phenomenon. The coupling obtained varies as a function of the polarity of the voltage applied between electrodes 10 and 20. The voltage polarity supplying the maximum coupling can be deduced from the crystal orientation of the material forming the substrate. If this orientation is unknown, it is extremely easy to experimentally determine the optimum polarity by measuring the light intensity transmitted by one of the guides for two polarities of opposite signs.

If the metal electrodes are deposited directly on the surface of the guides, the existence of an evanescent guide propagating in the relatively absorbing metal medium can lead to energy losses in the coupler. In the manner shown in FIG. 1, this can be prevented by placing a transparent dielectric layer 11, 21 between guides 1, 2 and electrodes 10, 20. This insulating layer is made from a material having a good transmission for the light wavelength carried by the guide, and a refractive index lower than that of the guide. Silica ($SiO_2$) is a particularly suitable material in the aforementioned case, where the substrate is formed from lithium niobate.

As is shown in FIG. 2, these two guides are parallel to one another over a rectilinear portion of length L, which is a function of the coupling length parameter which will be defined hereinafter. The distance between the rectilinear parallel portions has a value d, which must not exceed a few wavelengths (calculated in the medium separating the two guides) of the light carried by the guides. The two guides are made from the same electro-optical material which, when exposed to an electrical field, has a refractive index which varies as a function of the field value applied. The refractive index of this material is consequently chosen in such a way that, even in the presence of the electrical field applied, it remains above the index of the material forming substrate 3.

Due to the electro-optical characteristic of the material forming guides 1 and 2, the distribution of the field lines in the guides produces within them variations of the refractive index which are substantially equal in absolute value, but are of opposite signs.

However, when a wave is carried by a guide, part of the energy is propagated outside the guide in the medium surrounding it in the form of an evanescent wave. The amplitude of this wave decreases exponentially on moving away from the walls of the guide. If a second guide is arranged parallel to the first, as a result of the slope of said evanescent wave, it progressively traps the energy carried in the first wave and the closer the two guides are together, the faster this takes place. At the end of a given distance, called the coupling length which is dependent both on the geometrical and optical parameters of the two guides, and on the medium separating them (and particularly the refractive indices), an energy maximum has been transferred from the first guide into the second. Beyond this length, the reverse phenomenon occurs. The energy is progressively transferred from the second guide into the first, until a minimum value is reached in the second guide. Any change to the index of one of the media present clearly acts in one or other direction on the coupling length.

In the coupler shown in FIGS. 1 and 2, length L can be chosen equal to the coupling length, when the electrical field applied is absent. Due to the perfect symmetry of the two guides in the coupling zone, the energy transfer is total from the first to the second guide (or from the second to the first guide). The application of a voltage between electrodes 10 and 20 reduces the coupling length and part of the energy is retransferred from the second guide to the first (or from the first to the second). The overall result is that as the voltage increases, the energy transferred from the first guide to the second (or from the second to the first), measured at the end of the coupling zone, decreases until it reaches a zero value. The coupling between the two guides consequently decreases from 100 to 0%, when the voltage applied to the electrodes increases. The result would be the same if length L was given a value equal to an uneven multiple of the coupling length under the zero field.

It is also possible to give length L a value equal to an even multiple of the coupling length under a zero field. The coupling then increases from zero, when the voltage applied between the electrodes increases from zero.

Thus, a coupler is obtained which, on the control of an electric signal, makes it possible to switch all or part of the energy carried by a guide towards the other guide, which is associated therewith in the coupling zone.

It is obvious that if one of the two guides is limited to a section having as its minimum length, the length L of the coupling zone, said coupler is able to modulate 100% of the energy carried by the other guide.

However, it is also possible to operate in non-linear optics. Thus, unlike in the prior art coupler described hereinbefore, the coupler according to the invention is a non-linear integrated optical directional coupler. Coupling between the two waveguides takes place by means of evanescent waves propagated in the medium separating the two guides, but also by means of a non-linear interaction in the substrate in which the waveguides are formed. In other words, the coupling between these two guides only takes place for different wavelengths which have identical propagation constants in the two guides.

Such a structure makes it possible to spatially separate the pump waves and the waves generated by a non-linear effect, the two waves propagating in different guides.

Moreover, it is possible to use very large non-linear coefficients in certain materials, such as $\chi_{333}$ in lithium niobate or lithium tantalate.

Finally, the interaction can be regulated with the aid of an electrical field applied to the waveguide, in order to bring about phase matching between the guided modes.

The term pump wave is used to define the wave of frequency $\omega$ which supplies the energy, i.e. in FIG. 3 the phase which is transmitted in the first guide 5. The polarization induced in the pump wave is of form:

$$P = \chi_1 E + \chi_2 EE + \chi_3 EEE + \ldots$$

E being the electrical field to which the guide is subjected and which induces the polarization P. The term $\chi_2 EE$ is a term at frequency $2\omega$ which can be written:

$$e^{i/2\omega t - 2\beta(\omega)z}.$$

In the second guide 6, a wave of frequency $2\omega$ is propagated and is in form $e^{i/2\omega t - \beta(2\omega/z)}$.

Thus, on taking the example of the second harmonic generation in a non-linear crystal obtained by coupling between two waveguides, the power generated at frequency $2\omega$ from electromagnetic radiation guided in the first guide of frequency $\omega$ is written:

$$P(2\omega) \alpha A L^2 d^2 \left( \frac{\sin \Delta\beta L/2}{\Delta\beta L/2} \right)^2 \frac{P^2(\omega)}{S}$$

in which A is a constant dependent on the substrate used, $P(\omega)$ the power of the pump, S the surface on which interaction takes place, L the interaction length and d the non-linear coefficient used, $\Delta\beta$ representing the difference $2\beta(\omega) - \beta(2\omega)$ between the two wave vectors of the interacting wave.

Thus, in a random waveguide, it is known that the radiant energy can only be propagated in accordance with a discrete number of propagation modes, each characterized by a particular electromagnetic field distribution. Moreover, the propagation speed of the energy in the guide has a clearly defined value. To this speed corresponds a wave number $\beta = \omega/V_p$, $V_p$ being the phase velocity, such that at time t and at abscissa X, the electrical field E and the magnetic field H of an electromagnetic plane wave of frequency $\omega$ are in the form $A.e^{(\beta x - \omega t)}$, A being a complex amplitude. This quantity $\beta$ more particularly depends on the refractive index of the material constituting the guide, said index being itself a function of the frequencies $\omega$ or $p.\omega$ of the wave propagating therein, as well as the thickness of the guide.

$$P(2\omega) \text{ is maximum when } \left( \frac{\sin \Delta\beta L/2}{\Delta\beta L/2} \right)^2$$

is equal to 1, i.e. when $\Delta\beta = 0$ (phase matching), where $$\beta(2\omega) = \frac{2\pi}{\lambda} n(2\omega) \text{ and } \beta(\omega) = \frac{2\pi}{\lambda} n(\omega).$$

In a solid medium, this latter condition is equivalent to setting $n(\omega) = n(2\omega)$, which is generally impossible in normal dispersion regions. To satisfy this condition, use is made of the birefringence of certain materials, such a potassium deuterophosphate ($KD_2P_{04}$) and lithium niobate ($LiNbO_3$), jointly with adjustments to the propagation temperature or direction with respect to the axes of the crystal. In waveguides, assistance is also obtained from the modal dispersion in order to bring about phase matching.

The combination of these different principles has led to the production of frequency doublers and parametric oscillators, both in conventional optics and in guided optics.

In the coupler according to the invention, use is made of the modal dispersion by carrying out the interaction in two integrated optical waveguides forming a directional coupler, said two guides being produced by different processes.

As shown in FIG. 3, consideration is given to the generation of the second harmonic. Assuming that it is known how to produce two waveguides 5, 6, designated hereinafter I and II, in which it is possible to prove:

$$2\beta^I(\omega) = \beta^{II}(2\omega)$$

or $$\beta^I/K(\omega) = \beta^{II}/K(2\omega)$$

K being the wave number of the light in vacuum.

If these two guides are moved to a distance of a few wavelengths (a few micrometers) from one another, a directional coupler is forced. The latter is of a rather special type because, the two guides only resonate for two guided waves of different frequencies, one of which 24 propagates in the first guide 5 at frequency $\omega$ and the other 25 propagates in the second guide 6 at frequency $2\omega$. In general, we obtain:

$$\beta/K^I(\omega) \neq \beta/K^{II}(\omega) \text{ and } \beta/K^{II}(2\omega) \neq \beta/K^I(2\omega)$$

Thus, the coupler only resonates for wave 24 of frequency $\omega$ propagating in the first guide 5 and wave 25 of frequency $2\omega$ propagating in the second guide 6. It is clear that if an electro-optical material is used, it will be possible to vary the refractive indices of the waveguides and finally modify the frequency $\omega$ and $2\omega$ for which these two guides are resonant.

If the material from which the guides are made is optically non-linear, it is then clear that if a pump wave at frequency $\omega$ is coupled in the first guide 5, it will generate, by means of the non-linear coefficient used and the interguide coupling, a wave at the frequency $2\omega$, which propagates in the second guide. It should be noted that as:

$$\beta/K^I(\omega) \neq \beta/K^{II}(\omega)$$

the pump wave 24 of frequency $\omega$ is not coupled in the second guide 6 (or only in a negligible manner), the same applying with respect to wave 25 of frequency $2\omega$, which is not coupled in the first guide 5.

As the interaction is in phase matching, the wave at frequency $2\omega$ has an intensity increase with the interaction length L. At the outlet, it is merely necessary to separate the guide spatially in order to separate the wave of frequency $\omega$ and the wave of frequency $2\omega$.

The intensity of the wave at frequency $2\omega$ can be electrically regulated by means of electrodes 28, 29 of the "COBRA" type. The "COBRA" is a high-speed electro-optical switch, controllable by electrical signals having a relatively low power, which can be applied to integrated electro-optical circuits by means of electrodes deposited on the surface of the substrate on either side of two waveguides. Thus, this switch has two radiant energy guides deposited on the same substrate and parallel over a previously defined coupling length. The application of an electrical control field varies the refractive index of the guides with respect to one another and therefore ensures a maximum or minimum coupling between the two guides.

It is not possible to obtain phase matching between two waves carried by the two guides by using two guides obtained by titanium diffusion, because the two ranges $n_e(\omega) - (n_e(\omega) + \Delta n_e(\omega))$ and $n_e(2\omega) - (n_e(2\omega) + \Delta n_e(2\omega))$ separate it.

In order to bring about this matching in a lithium niobate crystal, one of the guides 6 is produced by titanium diffusion and the other 5 by ion exchange (e.g. $H^+$), which makes it possible to significantly increase the extraordinary index $n_e$:

the second guide 6 is produced by titanium diffusion;
the first guide 5 is produced by ion exchange, e.g. $H^+$ ion, giving $$(n_e + \Delta n_e)_I << (n_e + \Delta n_e)_{II}.$$

Thus, there is an intersection of the two ranges, unlike in the case with normal dispersion where we have:

$$n_e(2\omega) >> n_e(\omega)$$

In addition, ion exchange makes it possible to obtain very large index variations ($\Delta n_e \sim 0.12 - 0.15$), so that we have:
$(n_e + \Delta n_e)_I(\omega) > (n_e + \Delta n_e)_{II}(2\omega)$.
This means that the condition:

$$\beta/K^I(\omega) = \beta/K^{II}(2\omega),$$

which links the effective indices of the transmitted modes can be satisfied.

The two guides 5 and 6 do not necessarily have equal widths, but the propagation constants at frequency $\omega$ in the first guide 5 and at frequency $2\omega$ in the second guide 6 are equal.

When this phase matching condition is satisfied, the coupler is resonant and it is possible to have an energy exchange between the two guides and 6 for a wave of frequency $\omega$ in guide 5 and a wave of frequency $2\omega$ in guide 6. At the outlet, there are separated waves at these two frequencies $\omega$ and $2\omega$. Thus, there is no exchange at frequency $\omega$ between the two guides, which also applies at frequency $2\omega$.

Thus, in general:

$$\frac{\beta^I}{K}(\omega) \neq \frac{\beta^{II}}{K}(\omega)$$

and $$\frac{\beta^I}{k}(2\omega) \neq \frac{\beta^{II}}{K}(2\omega)$$

It is therefore possible to act on the polarization applied to the electrodes in order to regulate or preregulate the phase matching. This polarization is parallel to the crystal axis C, which is the axis of the extraordinary index of the substrate.

In this case, the two waves have extraordinary polarization, because the ion exchange only increases $n_e$, so that it is possible to use the non-linear coefficient $\chi_{333}$, which is the highest of lithium niobate and which is not usable in the prior art couplers, due to the unsold phase matching problems. The same results can be obtained with lithium tantalate.

Figure 4:
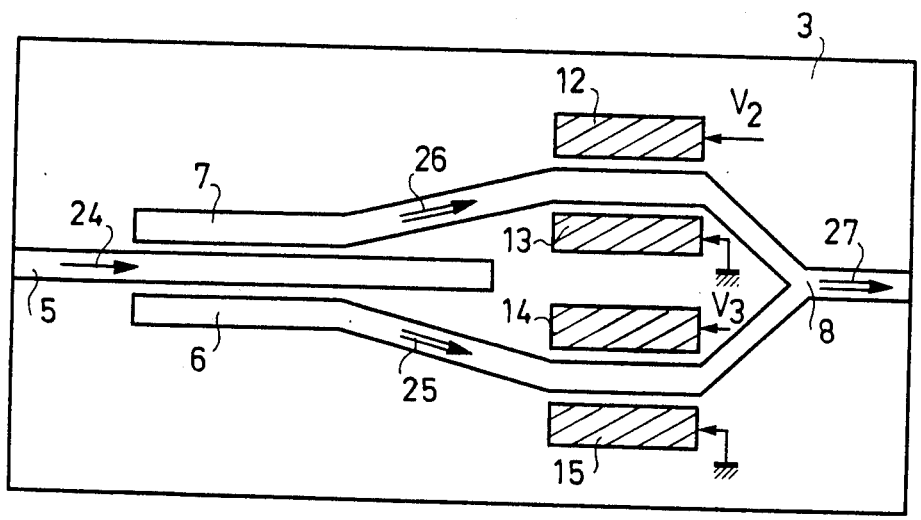
FIG. 4 a variant of the coupler according to the invention.

The process described hereinbefore can be used in a more complex configuration of a non-linear directional coupler with three guides. In this case and as shown in FIG. 4, use is made of a second guide 7, obtained by titanium diffusion and which is identical to guide 6, in which is also produced a wave at frequency $2\omega$. Thus, use is made of two evanescent waves existing on either side of guide 5.

It should be noted that the two guides 6 and 7 shown in FIG. 4 where the wave of frequency $2\omega$ propagates, can then be recombined in a monomodal guide with a single output 8. Electrodes 12, 13, 14, 15 make it possible to regulate the relative phase of the two waves 25, 26, prior to their recombination 27 in output guide 8. In this configuration, the efficiency of the interaction is naturally greater than that obtained in the preceding embodiment.

Figure 5:
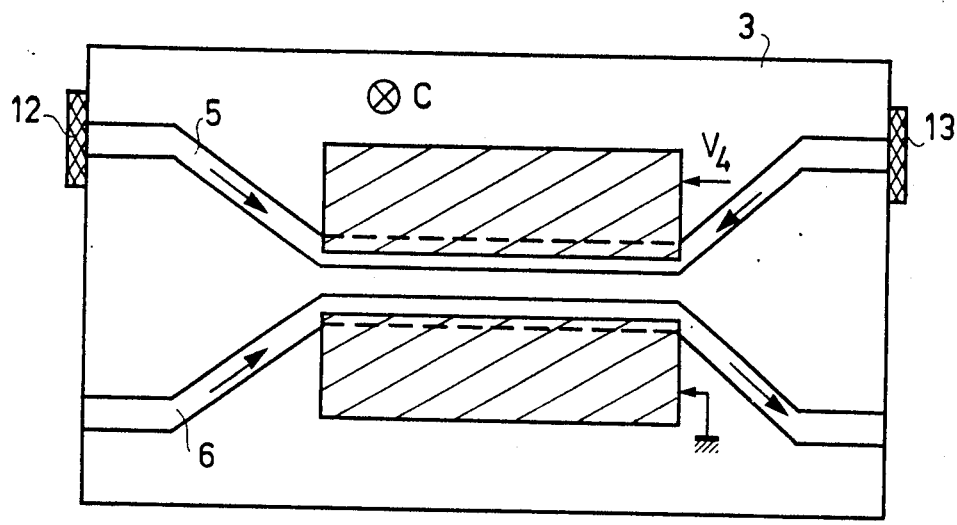
FIG. 5 a parametric oscillator incorporating the coupler according to the invention.

It is possible to use the same type of coupler as that described hereinbefore for producing a parametric oscillator shown in FIG. 5. Thus, an intense pump wave of frequency $\omega_p$ passed into a non-linear medium can give rise to a polarization containing two waves of frequencies $\omega_i$ and $\omega_s$, such that $\omega_p = \omega_s + \omega_i$. These phenomena are in principle identical to those involved in the parametric amplification of alternating currents. By analogy $\omega_p$ is called the pump wave, i.e. supplies energy to the system, whilst $\omega_i$ and $\omega_s$ which perform symmetrical tasks are called the "signal" wave and the "idler" wave.

Use can then be made of parametric amplification for producing oscillators, whilst incorporating the non-linear medium in a cavity identical to that of a laser. These "parametric oscillators", whereof the transmission offers the same coherence properties as that of lasers, have the interest that it is possible to continuously vary their frequency. Thus, when $\omega_p$ is predetermined, it is necessary to find two waves $\omega_i$ and $\omega_s$ respecting the conditions at the start. Moreover, if it is wished to form oscillators at $\omega_i$, the direction of the wave vector $k_i$ is imposed by the cavity.

If, for example, $\omega_p$ is transmitted as an extraordinary wave into a crystal of potassium deuterophosphate (KDP), it is then shown that for each value of $k_s$, there is a pair of ordinary waves ($\omega_i$, $\omega_s$), such that $\omega_i + \omega_s = \omega_p$ and proving $K_i + K_s = K_p$ with the given directions of $k_i$ and $k_p$. The values of $\omega_i$, $\omega_s$), are imposed by adjusting the angle $\theta$ of the crystal relative to the direction of $\omega_p$, which changes $k_p$, which is defined as being dependent on $\theta$ for an extraordinary wave, or not modifying the temperature of the crystal.

Thus, in FIG. 5, the pump wave is propagated in guide 6 and the signal and idler waves are produced in guide 5 in accordance with the conditions:

$$\omega_s + \omega_i = \omega_p$$

$$\beta^I(\omega s) + \beta^I(\omega_i) = \beta^{II}(\omega_p)$$

(It should be noted that other combinations must be possible, e.g. $\omega_s$ in guide 5 and $\omega_i$ and $\omega_p$ in guide 6).

If the gain is sufficient, it is possible to oscillate the coupler by producing a negative feedback in guide 5 (or guide 5 and guide 6) by e.g. producing reflective deposits 12 and 13 at $\omega_s$ and $\omega_i$ on the input and output edges of guide 5. The transmission wavelength of the coupler are conditioned by the aforementioned relations. In particular, they can be modified by the action of an electrical field, which will modify the refractive indices of the two guides and consequently the same matching conditions. Thus, it is possible to produce a parametric oscillator, whose wavelength is electrically regulatable. This oscillator can be of the single resonant (at frequency $\omega_s$) or doubly resonant (at frequencies $\omega_s$ and $\omega_i$ type) as a function of the means used for carrying out the negative feedback.

Thus, it is possible to produce a parametric oscillator supplying waves at frequency $\omega_p$, $\omega_s$ and $\omega_i$, which are such that:

$$\omega_p = \omega_s + \omega_i$$

and $$\beta/k(\omega p) = \beta/k(\omega_s) + \beta/k(\omega_i)$$

which translate the phase matching.

Figure 6:
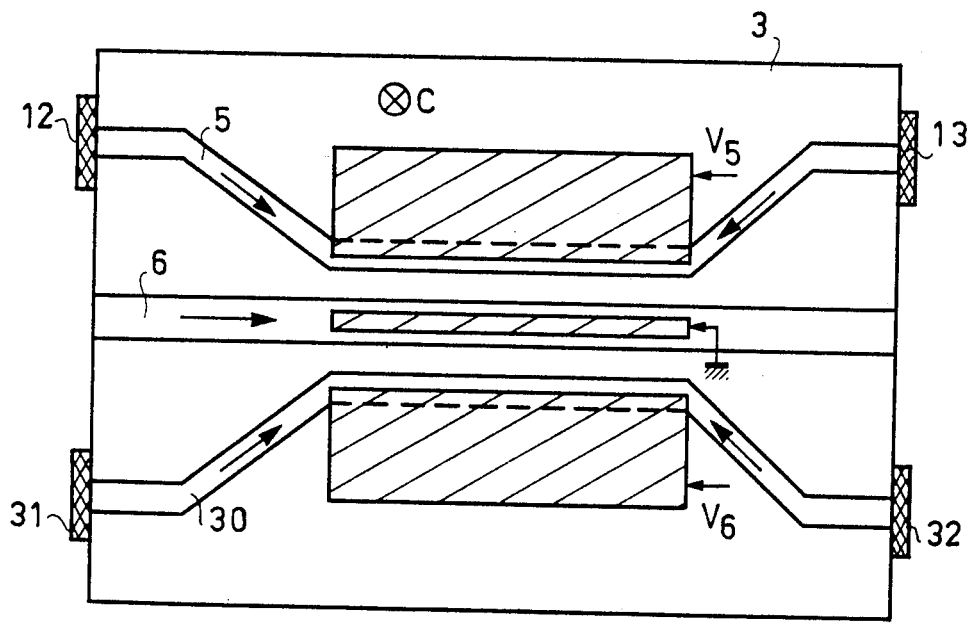
FIG. 6 a variant of the parametric oscillator shown in FIG. 5.

By varying the indices of these two waveguides, the frequencies are varied. Thus, in FIG. 5, such an oscillator has been produced by using the same technology as for the coupler shown in FIG. 2, i.e. guide 6 is produced by titanium diffusion in the substrate and guide 5 by ion exchange, e.g. H+ ions in the same substrate. In this case, it is also possible to use the very high coefficient $\chi_{333}$ in the lithium niobate By acting on the position of the electrodes and on the voltage applied thereto, it is possible to vary the frequency of the output waves. It is also possible to bring about an improvement illustrated in FIG. 6, in which the guide 6 obtained by titanium diffusion is located between two guides 5 and 30 obtained by ion exchange. Reflecting deposits 12, 13, 31, 32 are produced on the input and output faces of guide 30. Thus, in guide 5, there are waves of frequencies $\omega_s$ and $\omega_i$ and in guide 30 waves of frequencies $\omega_s'$ and $\omega_i'$.

In all the cases considered with respect to the invention, it is possible to regulate the waveguides by acting on the temperature. Thus, diffusion of titanium into the substrate takes place at approximately 1000° C., during a period of a few hours and the ion exchange of e.g. H+ ions takes place at approximately 250° C. for about 1 hour.

The guides considered in the present invention are not necessarily monomodal guides, the frequencies considered being those of modes transmitted in the guides.

What is claimed is:

1. A non-linear integrated optical coupler comprising a plane subtrate, having an input face and an output face, made from a non-linear electro-optical material, and at least two waveguides, disposed on the surface of said substrate, each of said waveguides being parallel to one another over a predetermined length and separated by a distance such that the incident wave radiation can be transferred from one guide to the other, wherein a first of said at least two waveguides comprises an ion exchanged layer of H+ ions in the substrate and a second of said at least two waveguides comprises a layer of diffused titanium in the substrate.

2. A coupler according to claim 1, wherein said first guide receives an incident wave of frequency $\omega$ and said, second guide, transmits a wave of frequency $2\omega$ produced by coupling, and wherein said coupler further comprises means for applying a modulating electrical field to at least one of said at least two guides in said predetermined length in order to bring about a phase matching between the incident wave of frequency $\omega$ and the wave produced by coupling of frequency $2\omega$.

3. A coupler according to claim 2, wherein as the substrate is made from a birefringent material, and wherein said means for applying a modulating field to at least one of the two guides comprise electrodes arranged on either side of said at least two waveguides, said electrodes producing in the substrate a polarization which is parallel to a axis carrying an extraordinary index of said substrate.

4. A coupler according to claim 2, wherein said at least two waveguides include a third waveguide of the same type as the second waveguide and arranged on the other side of said first guide with respect to said second guide, said second and third guides being recombined at the output in order to form a single output guide, said coupler further comprising means, for regulating the relative phase of waves carried out by these second and third guides, prior to their recombination in the output guide.

5. A coupler according to claim 1, wherein the substrate is made from a material having a high non-linear coefficient.

6. A coupler according to claim 5, wherein the substrate is made from lithium niobate, which has a high, order 3, non-linear susceptibility coefficient $\chi_{333}$.

7. A coupler according to claim 5, wherein the substrate is made from lithium tantalate, which has a high, order 3, non-linear susceptibility coefficient $\chi_{333}$.

8. A coupler according to claim 5, wherein the substrate is made from potassium deuterophosphate.

9. A parametric oscillator comprising a non-linear integrated optical coupler incorporating at least two waveguides according to claim 1, wherein the second guide receives the incident wave or pump wave of frequency $\omega_p$, the first guide transmits by coupling two waves of frequencies $\omega_s$ and $\omega_i$ such that $\omega_p = \omega_s + \omega_i$, reflecting deposits are placed on the input and output faces of the substrate in order to reflect at least one of the waves propagated in the first guide, whilst means for regulating frequencies $\omega_s$ and $\omega_i$ are provided.

10. A parametric oscillator according to claim 9, wherein these frequency regulating means comprise electrodes arranged on either side of the first and second guides in that part where they are parallel, permitting the regulation of the frequencies $\omega_s$ and $\omega_i$.

11. A parametric oscillator according to claim 9, wherein it comprises a third waveguide of the same type as the first waveguide arranged on the other side of the second guide with respect to the first guide, which transmits by coupling two waves of frequencies $\omega_s'$ and $\omega_i'$, reflecting deposits having been deposited on the input and output faces of the substrate in order to reflect at least one of the waves propagated in the third guide, whilst there are means for regulating these frequencies $\omega_s'$ and $\omega_i'$.

12. A parametric oscillator according to claim 11, wherein these frequency regulating means comprise electrodes arranged on either side of the guides in that part where they are parallel.

* * * * *